United States Patent
Lee et al.

(10) Patent No.: US 6,343,286 B1
(45) Date of Patent: Jan. 29, 2002

(54) EFFICIENT TECHNIQUE TO DEFER LARGE OBJECT ACCESS WITH INTERMEDIATE RESULTS

(75) Inventors: Christina Marie Lee, San Jose; Robert William Lyle, Morgan Hill; Jay A. Yothers, Gilroy, all of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/322,315

(22) Filed: May 28, 1999

Related U.S. Application Data
(60) Provisional application No. 60/101,729, filed on Sep. 24, 1998.

(51) Int. Cl.[7] ............................. G06F 17/30; G06F 7/00
(52) U.S. Cl. .......................................................... 707/3
(58) Field of Search .................................. 707/4, 2, 5

(56) References Cited

U.S. PATENT DOCUMENTS

| | | | |
|---|---|---|---|
| 4,509,119 A | 4/1985 | Gumaer et al. | 364/200 |
| 4,949,388 A | 8/1990 | Bhaskaran | 382/10 |
| 4,961,134 A | 10/1990 | Crus et al. | 364/200 |
| 5,043,866 A | 8/1991 | Myre, Jr. et al. | 395/200 |
| 5,222,235 A | 6/1993 | Hintz et al. | 395/600 |
| 5,247,672 A | 9/1993 | Mohan | 395/650 |
| 5,261,088 A | 11/1993 | Baird et al. | 395/600 |
| 5,291,583 A | 3/1994 | Bapat | 395/500 |
| 5,295,188 A | 3/1994 | Wilson et al. | 380/38 |
| 5,396,623 A | 3/1995 | McCall et al. | 395/600 |
| 5,408,654 A | 4/1995 | Barry | 395/600 |
| 5,416,915 A | 5/1995 | Mattson et al. | 395/425 |
| 5,418,921 A | 5/1995 | Cortney et al. | 395/425 |
| 5,418,940 A | 5/1995 | Mohan | 395/575 |
| 5,435,004 A | 7/1995 | Cox et al. | 395/575 |
| 5,452,299 A | 9/1995 | Thessin et al. | 370/62 |
| 5,455,944 A | 10/1995 | Haderle et al. | 395/600 |
| 5,517,641 A | 5/1996 | Barry et al. | 395/600 |

(List continued on next page.)

FOREIGN PATENT DOCUMENTS

JP 8-167852 6/1996

OTHER PUBLICATIONS

IBM Technical Disclosure Bulletin, "Segmented Relational Database Tables," vol. 38, No. 07, pp. 219–220, Jul. 1995.
IBM Technical Disclosure Bulletin, "Mapping a Relational Database to Hierarchical File System," vol. 38, No. 10, pp. 309–311, Oct. 1995.
IBM Technical Disclosure Bulletin, "Technique to Allow DB2 Utilities and Commands to Run While SQL Applications Have a Table Space Locked," vol. 36, No. 09A, pp. 499–501, Sep. 1993.
IBM Technical Disclosure Bulletin, "Spanning Temporary Reorg Files," vol. 36, No. 06A, p. 159, Jun. 1993.
IBM Technical Disclosure Bulletin, "Method For Storing Large Objects in a Relational Database," vol. 35, No. 4A, pp. 72–75, Sep. 1992.
IBM Technical Disclosure Bulletin, "Reorganization Flags For Tables Indexes," vol. 35, No. 5, pp. 156–157, Oct. 1992.

(List continued on next page.)

*Primary Examiner*—John Breene
*Assistant Examiner*—Susan Rayyan
(74) *Attorney, Agent, or Firm*—Sughrue Mion, PLLC

(57) ABSTRACT

A method, apparatus, and article of manufacture for a computer implemented technique for deferring large object access with intermediate results. A query is executed in a database stored on a data storage device connected to a computer. A control structure representing an expression in the query is generated. An intermediate result is generated by retrieving data for the query that is not represented by the control structure. Then, a result table is built using the processed intermediate result and the control structure.

23 Claims, 5 Drawing Sheets

U.S. PATENT DOCUMENTS

| | | | | |
|---|---|---|---|---|
| 5,566,329 | A | | 10/1996 | Gainer et al. ............... 395/600 |
| 5,579,499 | A | | 11/1996 | Fecteau et al. ............. 395/419 |
| 5,579,515 | A | | 11/1996 | Hintz et al. .................. 395/607 |
| 5,630,093 | A | | 5/1997 | Holzhammer et al. ...... 395/442 |
| 5,666,560 | A | | 9/1997 | Moertl et al. ............... 395/888 |
| 5,684,986 | A | | 11/1997 | Moertl et al. ............... 395/612 |
| 5,687,343 | A | | 11/1997 | Fecteau et al. ............. 395/412 |
| 5,721,915 | A | | 2/1998 | Sockut et al. ............... 395/616 |
| 5,727,197 | A | | 3/1998 | Burgess et al. ............. 395/602 |
| 5,732,402 | A | | 3/1998 | Lehman ...................... 707/205 |
| 5,737,601 | A | | 4/1998 | Jain et al. .................... 395/617 |
| 5,742,806 | A | | 4/1998 | Reiner et al. ............... 395/600 |
| 5,742,810 | A | | 4/1998 | Ng et al. ..................... 395/604 |
| 5,758,357 | A | | 5/1998 | Barry et al. ................. 707/202 |
| 5,761,667 | A | | 6/1998 | Koeppen ..................... 707/101 |
| 5,855,019 | A | * | 12/1998 | Bhargava et al. .............. 707/9 |
| 5,920,860 | A | * | 7/1999 | Maheshwari et al. .......... 707/5 |
| 6,092,062 | A | * | 7/2000 | Lohman et al. ................ 707/2 |
| 6,105,017 | A | * | 8/2000 | Kleewein et al. .............. 707/2 |

OTHER PUBLICATIONS

IBM Technical Disclosure Bulletin, "Fine Granularity Locking to Support High Data Availability in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. 156–165, Jan. 1996, Abstract considered.

MJ Carey, et al., "Object And File Management in The Exodus Extensible Database System," Proceedings of Very Large Data Bases. Twelfth International Conference on Very Large Data Bases, Kyoto, Japan, pp. 91–100, Aug. 25–28, 1986, Considered abstract.

ML McAuliffe, et al., "Towards Effective and Efficient Free Space Management," 1996 ACM SIGMOD International Conference on Management of Data, Montreal, Quebec, Canada, Jun. 4–6, 1996, Considered abstract.

C. Mohan, "Disk Read–Write Optimizations and Data Integrity in Transaction Systems Using Write–Ahead Logging," Proceedings of the Eleventh International Conference on Data Engineering (Cat. No. 95CH35724), Taipei, Taiwan, Mar. 6–10, 1995, Considered abstract.

Ki Sik Pang, et al., "An Efficient Recovery Scheme For Large Data in Multimedia DBMS," Journal of the Korea Information Science Society, vol. 22, No. 2, pp. 206–217, Feb. 1995, Considered abstract.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994, Considered abstract.

Martin Marshall, "Time Warner Big on Oracle Objects. (Testing Oracle 8's Ability to Move Large Object Blocks)," (Company Operations), (Brief Article), CommunicationsWeek Issue: n676, pp. 1–3, Aug. 11, 1997.

Dr. Michael Stonebraker, "The Empire Strikes Back: DB2 Universal Database," http://www.oreview.com/9704side-.htm, pp. 1–7, 1997.

GH Sokut, "A Method For On–Line Reorganization of a Database," IBM Systems Journal, vol.. 36, No. 3 pp. 411–436, 1997.

H. Koide, et al., "A New Memory Allocation Method For Shared Memory Multiprocessors With Large Virtual Address Space," Concurrency: Practice and Experience, vol. 9, No. 9, pp. 897–914, Sep. 1997.

* cited by examiner

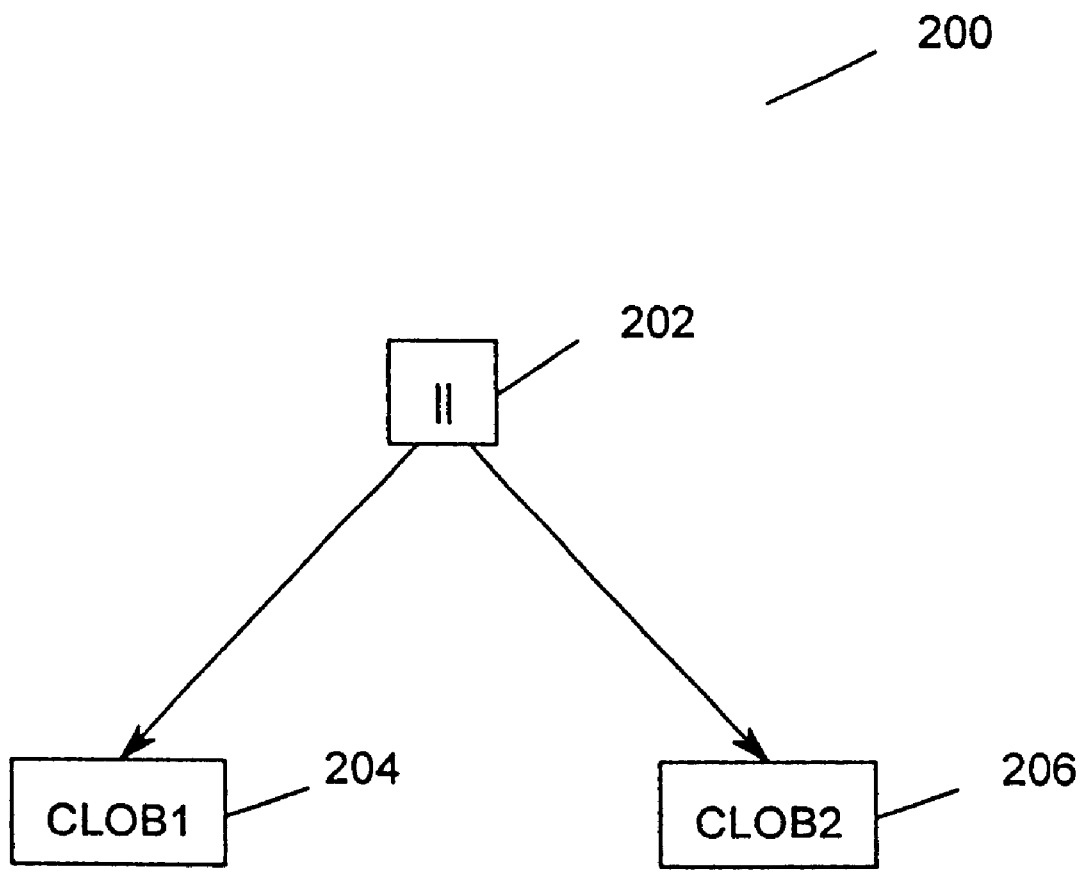

FIG. 3

```
302—SELECT TITLE,                                    ║ TITLE
      304 ┐  'Title = '                              ║ JANRATE
      306 ┐  ', January Rating = '                   ║ Substr(NOTES,NJAN,NFEB-NJAN)
      308 ┐  ', January Notes = '                    ║ Substr(RESPONSE,RJAN,RFEB-RJAN)
      310 ┐  ', January Response = '
      312 ┐  FROM (SELECT T1.TITLE,
              T1.NOTES,
              POSSTR(T1.NOTES'Jan') AS NJAN,
              POSSTR(T1.NOTES'Feb') AS NFEB,
              T2.JANRATE,
              T2.RESPONSE,
              POSSTR(T2.RESPONSE, 'Jan') AS RJAN,
              POSSTR(T2.RESPONSE, 'Feb') AS RFEB,
              FROM T1 JOIN T2 ON T1.TITLE = T2.TITLE)
              AS TJ

314—ORDER BY TITLE;
```

⌒300

EFFICIENT TECHNIQUE TO DEFER LARGE OBJECT ACCESS WITH INTERMEDIATE RESULTS

PROVISIONAL APPLICATION

This application claims the benefit of U.S. Provisional Application No. 60/101,729, entitled "IMPROVED DATABASE SYSTEM," filed on Sep. 24, 1998, by Charles R. Bonner et al., which is incorporated by reference herein.

CROSS-REFERENCE TO RELATED APPLICATIONS

This application is related to the following co-pending and commonly-assigned patent applications:

Application Ser. No. 09/322,312, entitled "USING AN EPOCH NUMBER TO OPTIMIZE ACCESS WITH ROWID COLUMNS AND DIRECT ROW ACCESS," filed on same date herewith, by Robert W. Lyle et al.;

Application Ser. No. 09/321,675, entitled "A FAST TECHNIQUE FOR RECOVERING AN INDEX ON AN AUXILIARY TABLE," filed on same date herewith, by Robert W. Lyle et al.;

Application Ser. No. 09/322,292, entitled "STORING AN UNCOMPRESSED DATA LENGTH IN A LOB MAP TO SPEED SUBSTRING ACCESS WITHIN A LOB VALUE," filed on same date herewith, by Robert W. Lyle et al.;

Application Ser. No. 09/322,287, entitled "A TECHNIQUE TO AVOID PROCESSING WELL CLUSTERED LOB'S DURING REORGANIZATION OF A LOB TABLE SPACE," filed on same date herewith, by Charles R. Bonner et al.;

Application Ser. No. 09/322,317, entitled "AN OPTIMIZED TECHNIQUE FOR PREFETCHING LOB TABLE SPACE PAGES," filed on same date herewith, by Charles R. Bonner et al.;

Application Ser. No. 09/322,286, entitled "A TECHNIQUE FOR CREATING A UNIQUE QUASI-RANDOM ROW IDENTIFIER," filed on same date herewith, by Robert W. Lyle et al.;

Application Ser. No. 09/322,698, entitled "A TECHNIQUE FOR DETERMINING AN AGE OF AN OLDEST READING TRANSACTION WITHIN A DATABASE OBJECT," filed on same date herewith, by Robert W. Lyle et al.; and Application Ser. No. 09/322,316, entitled "A TECHNIQUE FOR INPLACE REORGANIZATION OF A LOB TABLE SPACE," filed on same date herewith, by Charles R. Bonner et al.;

each of which is incorporated by reference herein.

BACKGROUND OF THE INVENTION

1. Field of the Invention

This invention relates in general to computer-implemented database systems, and, in particular, to deferring large object access with intermediate results.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables are stored on DASD, such as magnetic or optical disk drives for semi-permanent storage.

A table space can be a system managed space (e.g., an operating system file system) or a database managed space. Each table space is physically divided into equal units called pages. Each page, which typically contains 4K bytes, holds one or more rows of a table and is the unit of input/output (I/O). The rows of a table are physically stored as records on a page. A record is always fully contained within a page and is limited by page size. As users move towards working with image data and other large data objects, storing data in conventional records becomes difficult.

An index is an ordered set of references to the records or rows in a database file or table. The index is used to access each record in the file using a key (i.e., one of the fields of the record or attributes of the row). However, building an index for a large file can take a considerable amount of elapsed time. The process involves scanning all records in the file, extracting a key value and record identifier (rid) value from each of the records, sorting all of the key/rid values, and then building the index from the sorted key/rid values. Typically, the scanning, sorting, and index build steps are performed serially, which can be time consuming in the case of a large database file.

Traditionally, an RDBMS stored simple data, such as numeric and text data. In a traditional RDBMS, the underlying storage management has been optimized for simple data. More specifically, the size of a record is limited by the size of a data page, which is a fixed number (e.g., 4K) defined by a computer developer. This restriction in turn poses a limitation on the length of columns of a table. To alleviate such a restriction, most computer developers today support a new built-in data type for storing large objects (LOBs). Large objects, such as image data, typically take up a great deal of storage space.

An RDBMS often generates intermediate result sets in the process of satisfying a query. Each row of these intermediate result sets contain the data from all necessary columns. For example, if a table included five columns, with two columns containing large object data, the RDBMS would generate a row with all five columns. However, for performance and storage reasons, it is desirable to access large objects as infrequently as possible. Thus, it is desirable to avoid placing the large object data into the intermediate result sets.

Therefore, there is a need in the art for an improved technique of deferring large object access with intermediate results.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented technique of deferring large object access with intermediate results.

In accordance with the present invention, a query is executed in a database stored on a data storage device connected to a computer. A control structure representing an expression in the query is generated. An intermediate result is generated by retrieving data for the query that is not represented by the control structure. Then, a result table is built using the processed intermediate result and the control structure.

BRIEF DESCRIPTION OF THE DRAWINGS

Referring now to the drawings in which like reference numbers represent corresponding parts throughout:

FIG. 2 is an example of a control structure for an SQL statement;

FIG. 3 illustrates an SQL statement;

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
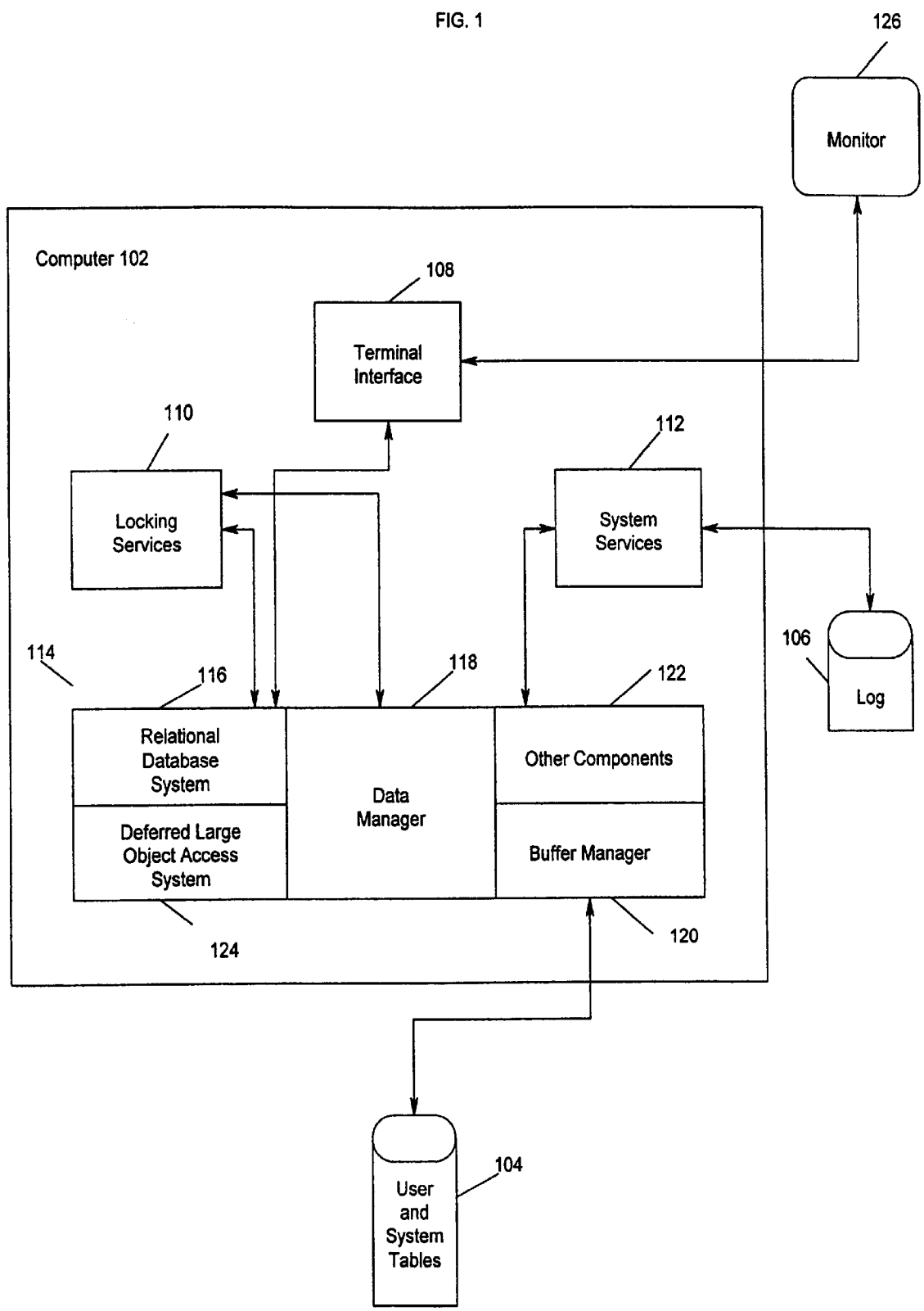
FIG. 1 is a block diagram illustrating an exemplary computer hardware environment that could be used in accordance with the present invention.

FIG. 1 is a block diagram illustrating an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the OS/390® operating system. Those skilled in the art will recognize, however, that the present invention has application program to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Deferred Large Object Access ("DLOA") System, and other components 122 such as an SQL compiler/interpreter. These submodules support the functions of the SQL language, i.e. definition, access control, interpretation, compilation, database retrieval, and update of user and system data. The DLOA system 124 works in conjunction with the other submodules to defer large object access with intermediate results.

The present invention is generally implemented using SQL statements executed under the control of the Database Services module 114. The Database Services module 114 retrieves or receives the SQL statements, wherein the SQL statements are generally stored in a text file on the data storage devices, such as 104, or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices, such as 104, into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Deferring Large Object Access with Intermediate Results

The deferred large object access ("DLOA") system 124 of the present invention includes an efficient technique for deferring access to large objects, even when they would otherwise have been placed in an intermediate result set. The DLOA system 124 allows for the deferral of large object data access even when that data is a result of a complex string expression involving multiple columns, operators, and functions.

In an RDBMS, it is sometimes necessary to generate an intermediate result set in the course of satisfying a query. For example, if a query selects rows and then orders the rows based on a column value, the RDBMS will normally generate an intermediate result set containing the selected rows, and then, the RDBMS will put the rows in a desired order.

The following SQL query is a simple example that involves sorting the intermediate result table into a desired order:

SELECT COL1, COL2 FROM T1 ORDER BY COL1

In the SQL query above, if the rows of table T1 cannot be retrieved in the desired order, it is necessary to place the column values of columns COL1 and COL2 from the rows of table T1 into an intermediate result set in order to sort the rows based on the values of the COL1 column. If in the example above, COL2 contains a large object with a length of one million bytes (1MB), it would be desirable to avoid placing the one million byte value of the large object in COL2 into the result set, so that the sort process wouldn't have to deal with such large amounts of data.

One solution to this problem might be placing a pointer to the proper row of table T1 in the intermediate result set rather than the column COL2 value. Then, when returning the rows of the final result set to the user, that pointer may be used to re-access the proper table T1 row to retrieve the proper column COL2 value to be returned for each row in that final result set. This technique, however, is not sufficient to satisfy the desired deferral of access if the column to be returned was the result of a complex string expression involving multiple columns, operators, and functions.

Instead of materializing the value of the expression, the DLOA system 124 uses a control structure to represent the complex expression. Additionally, the DLOA system 124 uses a set of buffers and data pointers that contain or represent the data elements to be used in the expression. In one embodiment of the invention, the control structure does not change from row to row, but the data in the buffers and the data pointers changes to reflect the data in each row. However, in other embodiments of the invention, the control structure may vary row to row.

The DLOA system 124 establishes a control structure identifier that represents the control structure to be used to resolve the expression. For each row in the intermediate result set, the DLOA system 124 establishes data pointers for each of the large object data elements used in the expression. For example, the content of the intermediate result set rows would contain the value of a column to be used to order the rows and a condensed representation of the expression, consisting of the control structure identifier, the non-large object data elements, and the large object data pointers that participate in that expression.

In this way, the data in the intermediate result set rows is minimized so that the data manipulated by the sorting operation is kept to a minimum. Once the intermediate result set rows are sorted in order, they can be retrieved from the intermediate result set and returned as the final result of the query. During this process, for each row of the intermediate result set, the control structure identifier is used to identify the proper control structure that represents the expression. Further, the data elements and large object data pointers from that row are used to repopulate the control structure's data buffers and data pointers. From that point, the control structure can be used as though there was no intermediate result set to return the result of the expression.

Note that this technique can also be used to communicate the resulting rows to the coordinator of the parallel process, when using multiple nodes in a tightly coupled or loosely coupled shared data environment to process the results of a query in parallel.

FIG. 2 is an example of a control structure 200 for the following SQL statement:

SELECT C1, CLOB1 || CLOB2 FROM TABLE-A ORDER BY C1

In the above SQL statement, columns C1, CLOB1, and CLOB2 are retrieved from table TABLE-A and ordered by the value of column C1. Columns CLOB1 and CLOB2 contain large objects. If the rows from table TABLE-A cannot be retrieved in the desired order, the DLOA system 124 generates a control structure 200 to represent the large object columns. The concatenation block 202 is connected to the columns CLOB1 204 and CLOB2 206 to be concatenated. The two parallel lines in block 202 represent a concatenation operation. The result of using the control structure 200 may be represented as follows:

C1 structure token, PH1, PH2

The C1 represents column C1, the structure token is an invariant that identifies the control structure 200, and PH1 and PH2 correspond, respectively, to and provide descriptions for columns CLOB1 and CLOB2.

The intermediate result is a table with two columns, one being a column for the values of column C1 and the other being a column for the expression represented by the control structure 200. Once the values of column C1 are retrieved into the intermediate result table, the rows may be ordered by the value of column C1. Then, the structure token is used, for each row of the intermediate result table, to identify the control structure and to repopulate the variants in the expression. That is, the control structure 200 does not change row to row, but the values of columns CLOB1 204 and CLOB2 206 change. Thus, the values of the large object columns are not retrieved until after the rows have been ordered properly.

FIG. 3 illustrates an SQL statement 300. A title is selected as indicated in line 302. Then, on line 304, the text 'Title=' and the value for TITLE are concatenated. The title information is concatenated with the text 'January Rating=' and the value for JANRATE on line 306. This information is concatenated with the text 'January Notes' and the value of a substring expression on line 308. This information is concatenated with the text 'January Response=' and the value of a substring on line 310. The data for this SELECT statement is retrieved from tables using another SELECT statement on line 312. In particular, the values of TITLE, JANRATE, NOTES, NJAN, NFEB, RESPONSE, RJAN, and RFEB are retrieved from tables T1 and T2, as indicated by the FROM clause on line 312. The retrieved rows are ordered by the values of the TITLE column, as indicated on line 314.

The operation Substr(NOTES, NJAN, NFEB-NJAN) on line 308 retrieves a substring from the NOTES large object starting at the value of NJAN for a length of the value of NFEB-NJAN. The operator Substr (RESPONSE, RJAN, RFEB-RJAN) on line 310 retrieves a substring from the RESPONSE large object, starting at the value of RJAN for a length of the value of RFEB-RJAN.

If the NOTES and RESPONSE columns are large object columns, the result of the expression is also a large object. If it is not possible to retrieve the rows of table T1 in TITLE order, it is necessary to create an intermediate result set so that the rows that are retrieved from table T1 can be sorted into the desired order on TITLE. Since the result of the expression is a large object, it is therefore desirable to avoid placing the entire result of the expression into the intermediate result table.

Figure 4:
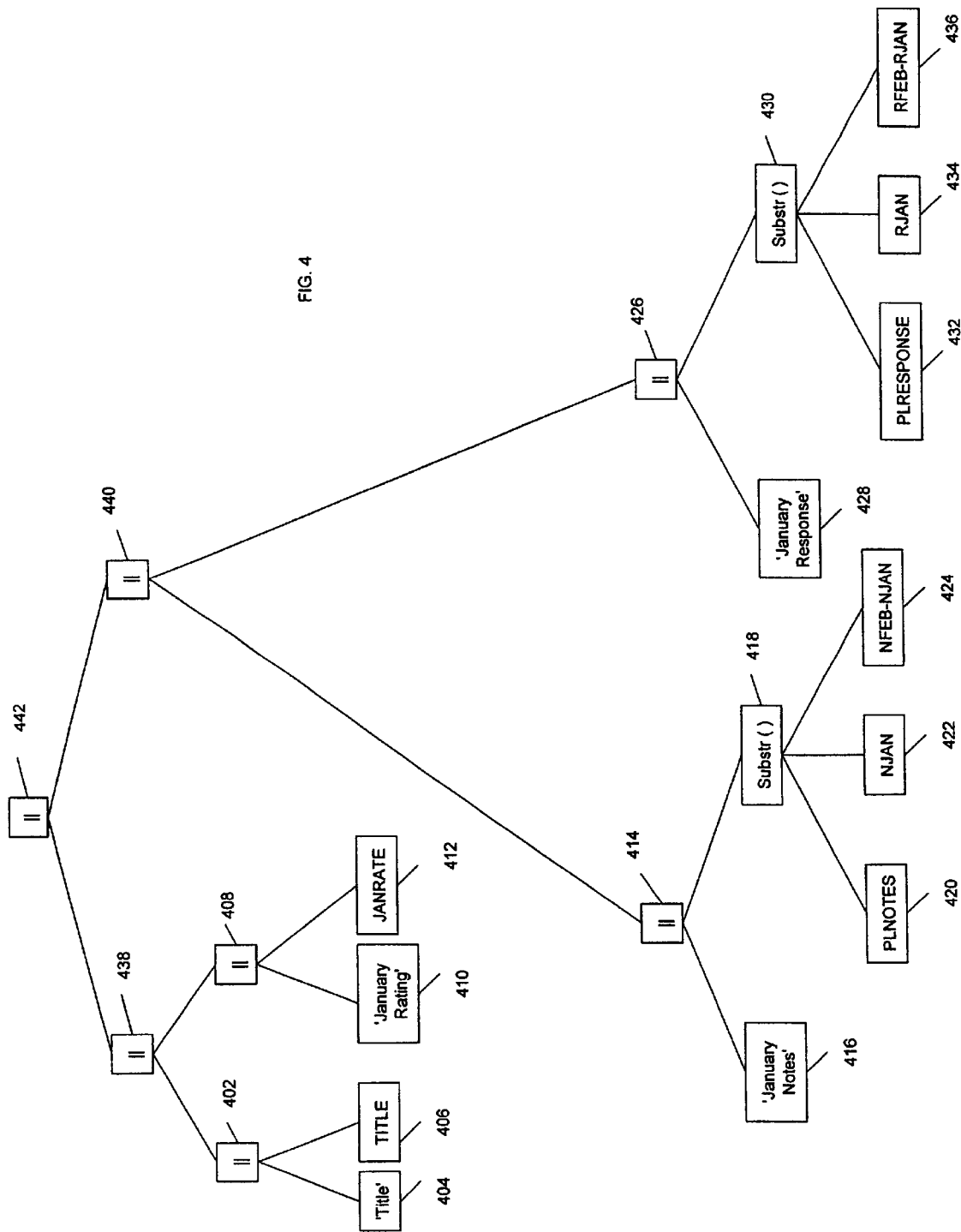
FIG. 4 is an example of a control structure of a portion of the SQL statement illustrated in FIG. 3.

FIG. 4 is an example of a control structure 400 of a portion of the SQL statement 300 illustrated in FIG. 3 lines 305 through 310. Concatenation block 402 is connected to the 'Title' text block 404 and the TITLE value block 406, indicating that the text and value are to be concatenated and representing the first concatenation operation of line 304. Concatenation block 408 is connected to the 'January Rating' text block 410 and the JANRATE value block 412 and represents the first concatenation operation of line 306.

Concatenation block 414 is connected to 'January Notes' text block 416 and the Substr( ) block 418 and represents the first concatenation operation on line 308. Additionally, the Substr( ) block 418 is connected to the PLNOTES value block 420, the NJAN value block 422, and the NFEB-NJAN value block 424 and represents the substring operation of line 308. The PLNOTES value block 420 is actually a placeholder for the large object value for the NOTES large object.

Concatenation block 426 is connected to 'January Response' text block 428 and Substr( ) block 430 and represents the first concatenation operation on line 310. The Substr ( ) block 430 is connected to the PLRESPONSE value block 432, the RJAN value block 434, and the RFEB-RJAN value block 436. The PLRESPONSE value block 432 is a placeholder for the large object value for the RESPONSE large object.

The concatenation block 438 represents the concatenation of the title and January rating information, which is the second concatenation operation of line 304. The concatenation block 440 represents the concatenation of the January notes and January response information, which is the second concatenation operation of line 308. The concatenation block 442 represents the concatenation of the title and January rating information with the January notes and January response information, which is the second concatenation operation of line 306.

Once the intermediate table contains ordered rows, the DLOA system 124 uses the control structure 400 to retrieve values for the columns represented in the control structure. The control structure 400 is used for each row of the intermediate table.

The DLOA system 124 establishes a control structure identifier that represents the control structure to be used to resolve the expression. For each row in the intermediate result set, the DLOA system 124 establishes data pointers for each of the large object data elements used in the expression. For the SQL statement illustrated in FIG. 3, the content of the intermediate result set rows would contain the value of the TITLE column and a condensed representation of the expression, consisting of the control structure identifier, the non-large object data elements, and the large object data pointers that participate in that expression. In this way, the data in the intermediate result set rows is minimized so that the data manipulated by the sorting operation is kept to a minimum.

Once the intermediate result set rows are sorted in TITLE order, the DLOA system 124 retrieves the rows from the intermediate result set and returns the rows as the final result of the query. During this process, for each row of the intermediate result set, the DLOA system 124 uses the control structure identifier to identify the proper control structure that represents the expression. Further, the DLOA system 124 uses the data elements and large object data pointers from that row to repopulate the control structure's data buffers and data pointers. From that point, the DLOA system 124 uses the control structure as though there were no intermediate result set and returns the result of the query.

Although this disclosure has provided one embodiment of the invention directed to intermediate result sets, one skilled in the art would recognize that the technique of the present invention can also be used for other systems. For example, the technique of the present invention can be used when using multiple nodes in a tightly coupled or loosely coupled shared data environment to process the results of a query in parallel and to communicate the resulting rows to the coordinator of the parallel process.

Figure 5:
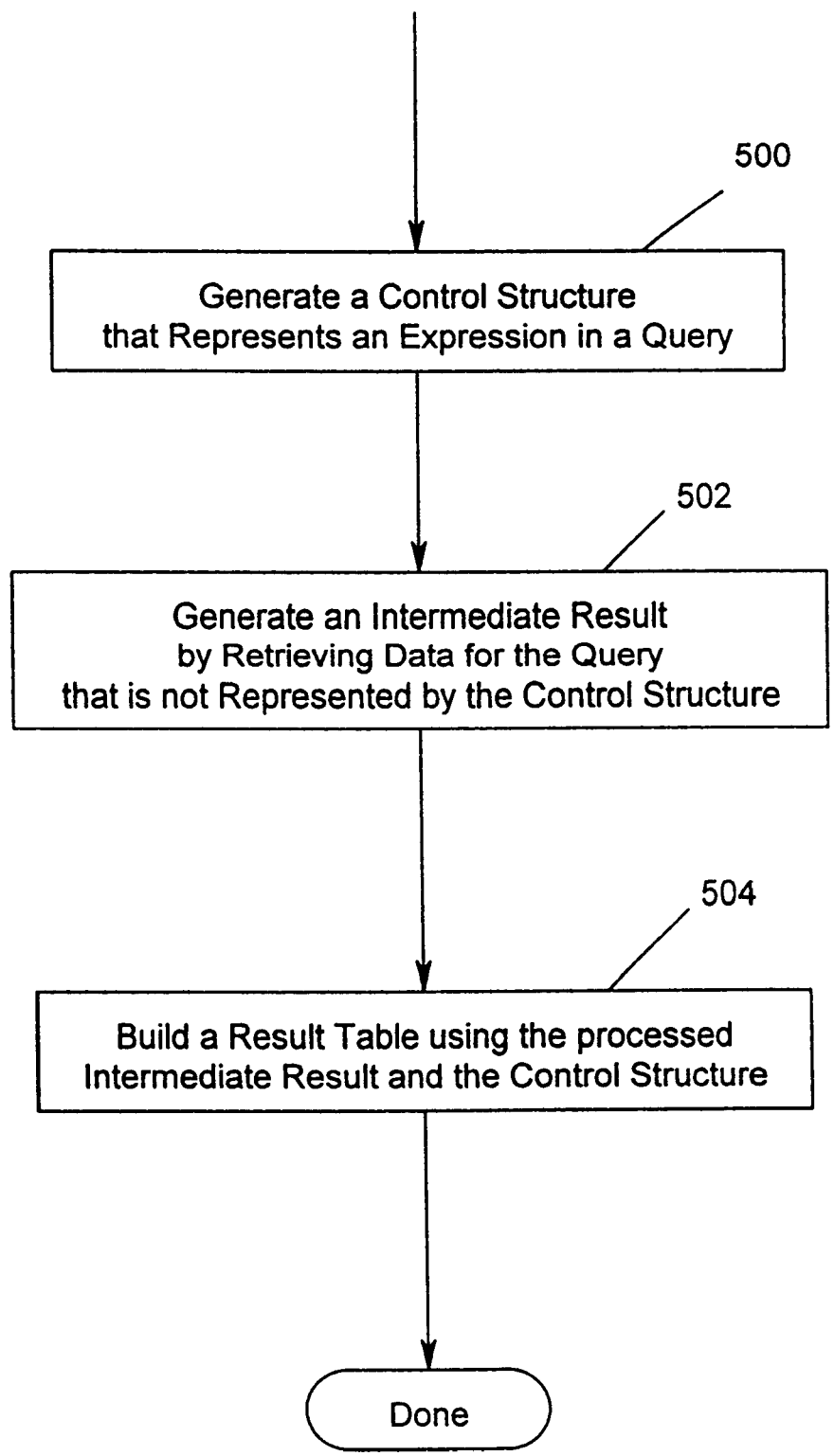
FIG. 5 is a flow diagram representing the steps performed by the Deferred Large Object Access system.

FIG. 5 is a flow diagram representing the steps performed by the DLOA system 124. In block 500, the DLOA system 124 generates a control structure that represents an expression in a query. In block 502, the DLOA system 124 generates an intermediate result by retrieving data for the query that is not represented by the control structure. In block 504, the DLOA system 124 builds a result table using the processed intermediate result and the control structure.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query in a database stored on a data storage device connected to a computer, the method comprises:

generating a control structure representing an expression in the query;

generating an intermediate result by retrieving data for the query that is not represented by the control structure; and building a result table using the processed intermediate result and the control structure.

2. The method of claim 1, wherein the control structure comprises an invariant.

3. The method of claim 1, wherein the control structure comprises a variable structure.

4. The method of claim 1, wherein the control structure comprises a placeholder for a large object.

5. The method of claim 4, wherein building the result table further comprises replacing the placeholder with a value.

6. The method of claim 1, wherein the intermediate result is comprised of rows and wherein generating an intermediate result further comprises performing an operation on the rows.

7. The method of claim 1, wherein the intermediate result is comprised of rows and wherein building the result table further comprises using the control structure to retrieve data for each of the rows of the intermediate result.

8. An apparatus for executing a query, comprising:

a computer having a data storage device connected thereto, wherein the data storage device stores a database;

one or more computer programs, performed by the computer, for generating a control structure representing an expression in the query, generating an intermediate result by retrieving data for the query that is not represented by the control structure, and building a result table using the processed intermediate result and the control structure.

9. The apparatus of claim 8, wherein the control structure comprises an invariant.

10. The apparatus of claim 8, wherein the control structure comprises a variable structure.

11. The apparatus of claim 8, wherein the control structure comprises a placeholder for a large object.

12. The apparatus of claim 11, wherein the one or more computer programs that build the result table further comprise one or more computer programs that replace the placeholder with a value.

13. The apparatus of claim 11, wherein the one or more computer programs that build the result table further comprise one or more computer programs that replace the placeholder with a value.

14. The apparatus of claim 8, wherein the intermediate result is comprised of rows and wherein the one or more computer programs that generate an intermediate result further comprise one or more computer programs for performing an operation on the rows.

15. The apparatus of claim 8, wherein the intermediate result is comprised of rows and wherein the one or more computer programs that build the result table further comprise one or more computer programs that use the control structure to retrieve data for each of the rows of the intermediate result.

16. The apparatus of claim 8, wherein the intermediate result is comprised of rows and wherein the one or more computer programs that generate an intermediate result further comprise one or more computer programs for performing an operation on the rows.

17. The apparatus of claim 8, wherein the intermediate result is comprised of rows and wherein the one or more computer programs that build the result table further comprise one or more computer programs that use the control structure to retrieve data for each of the rows of the intermediate result.

18. An article of manufacture comprising a computer program carrier readable by a computer and embodying one or more instructions executable by the computer to perform a method that executes a query in a database stored in a data storage device connected to the computer, the method comprises:

generating a control structure representing an expression in the query;

generating an intermediate result by retrieving data for the query that is not represented by the control structure; and building a result table using the processed intermediate result and the control structure.

19. The article of manufacture of claim 18, wherein the control structure comprises an invariant.

20. The article of manufacture of claim 18, wherein the control structure comprises a placeholder for a large object.

21. The article of manufacture of claim 20, wherein building the result table further comprises replacing the placeholder with a value.

22. The article of manufacture of claim 18, wherein the intermediate result is comprised of rows and wherein generating an intermediate result further comprises performing an operation on the rows.

23. The article of manufacture of claim 18, wherein the intermediate result is comprised of rows and wherein building the result table further comprises using the control structure to retrieve data for each of the rows of the intermediate result.

* * * * *